United States Patent
Nango et al.

(10) Patent No.: US 9,304,952 B2
(45) Date of Patent: Apr. 5, 2016

(54) MEMORY CONTROL DEVICE, STORAGE DEVICE, AND MEMORY CONTROL METHOD

(75) Inventors: Takahiro Nango, Hino (JP); Hiroyuki Moro, Hachioji (JP); Tohru Fukuda, Nishitokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 879 days.

(21) Appl. No.: 13/205,193

(22) Filed: Aug. 8, 2011

(65) Prior Publication Data

US 2012/0102262 A1    Apr. 26, 2012

(30) Foreign Application Priority Data

Oct. 21, 2010  (JP) ................................. 2010-236549

(51) Int. Cl.
G06F 13/16 (2006.01)
G11B 20/18 (2006.01)
G06F 3/06 (2006.01)

(52) U.S. Cl.
CPC .......... *G06F 13/1642* (2013.01); *G06F 3/0656* (2013.01); *G11B 20/18* (2013.01)

(58) Field of Classification Search
CPC .... G06F 3/0656; G06F 13/1642; G11B 20/18
USPC ............................. 711/103, 114, 150; 714/46
See application file for complete search history.

(56) References Cited

U.S. PATENT DOCUMENTS

| | | | |
|---|---|---|---|
| 5,912,848 A | 6/1999 | Bothwell | |
| 2003/0033573 A1* | 2/2003 | Tamura et al. | 714/763 |
| 2003/0079073 A1* | 4/2003 | Richard et al. | 710/302 |
| 2004/0073767 A1* | 4/2004 | Johnson et al. | 711/202 |
| 2007/0011396 A1* | 1/2007 | Singh et al. | 711/105 |
| 2010/0030946 A1 | 2/2010 | Kano et al. | |
| 2010/0241797 A1 | 9/2010 | Kitahara | |
| 2010/0262721 A1* | 10/2010 | Asnaashari et al. | 710/5 |

FOREIGN PATENT DOCUMENTS

| | | |
|---|---|---|
| JP | 10-111837 | 4/1998 |
| JP | 2001-027966 | 1/2001 |
| JP | 2008-102819 | 5/2008 |
| JP | 2010-033393 | 2/2010 |
| JP | 2010-108385 | 5/2010 |
| WO | WO 2007/018778 | 2/2007 |
| WO | WO 2009/140112 | 11/2009 |

OTHER PUBLICATIONS

Japanese Office Action dated Dec. 13, 2011 for Japanese Application No. 2010-236549 filed Oct. 21, 2010.

* cited by examiner

*Primary Examiner* — Mark Giardino, Jr.
(74) *Attorney, Agent, or Firm* — Knobbe, Martens, Olson & Bear, LLP

(57) ABSTRACT

According to one embodiment, a memory control device includes: queues in channels; first controller; generator; and second controller. The queues hold write commands for data pieces. The first controller causes: (i) when a read command is received, and until the write commands are held in the queues, the channels are synchronized with each other, and processes of the write commands become ready to be performed, a read process based on the read command prior to the write commands; and, (ii) when the processes of write commands become ready to be performed, synchronization of the channels and write processes for the data pieces based on the write commands. The generator generates error correction codes based on the data pieces when the channels are synchronized with each other and the processes based on the write commands are performed. The second controller writes the error correction codes on the storage medium.

5 Claims, 11 Drawing Sheets

FIG.3

| ORDER OF PRIORITY | TYPE OF QUEUE |
|---|---|
| 1 | B MULTI-QUEUE |
| 2 | A READ QUEUE |
| 3 | SINGLE READ QUEUE |
| 3 | USER MULTI-QUEUE |

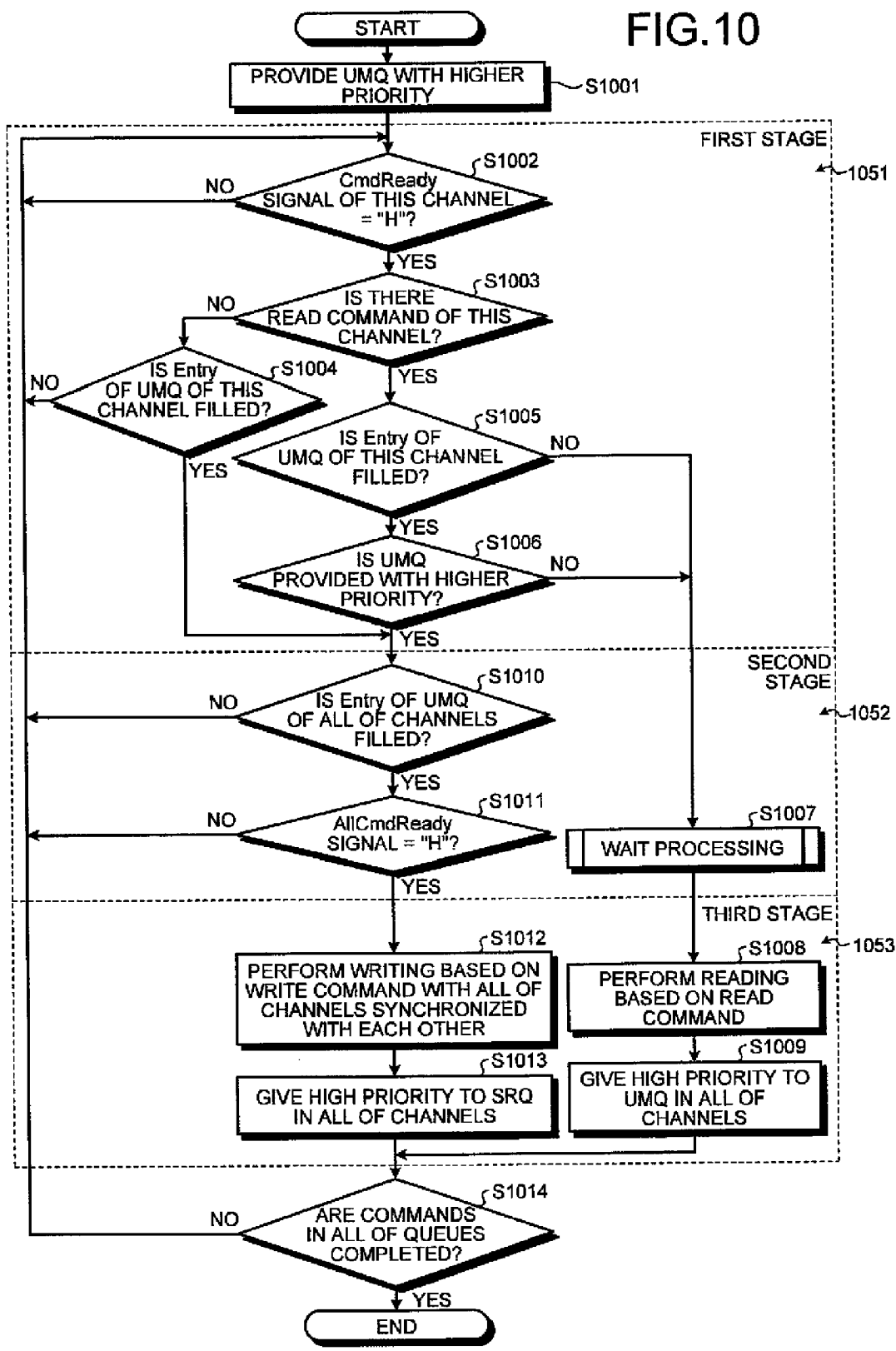

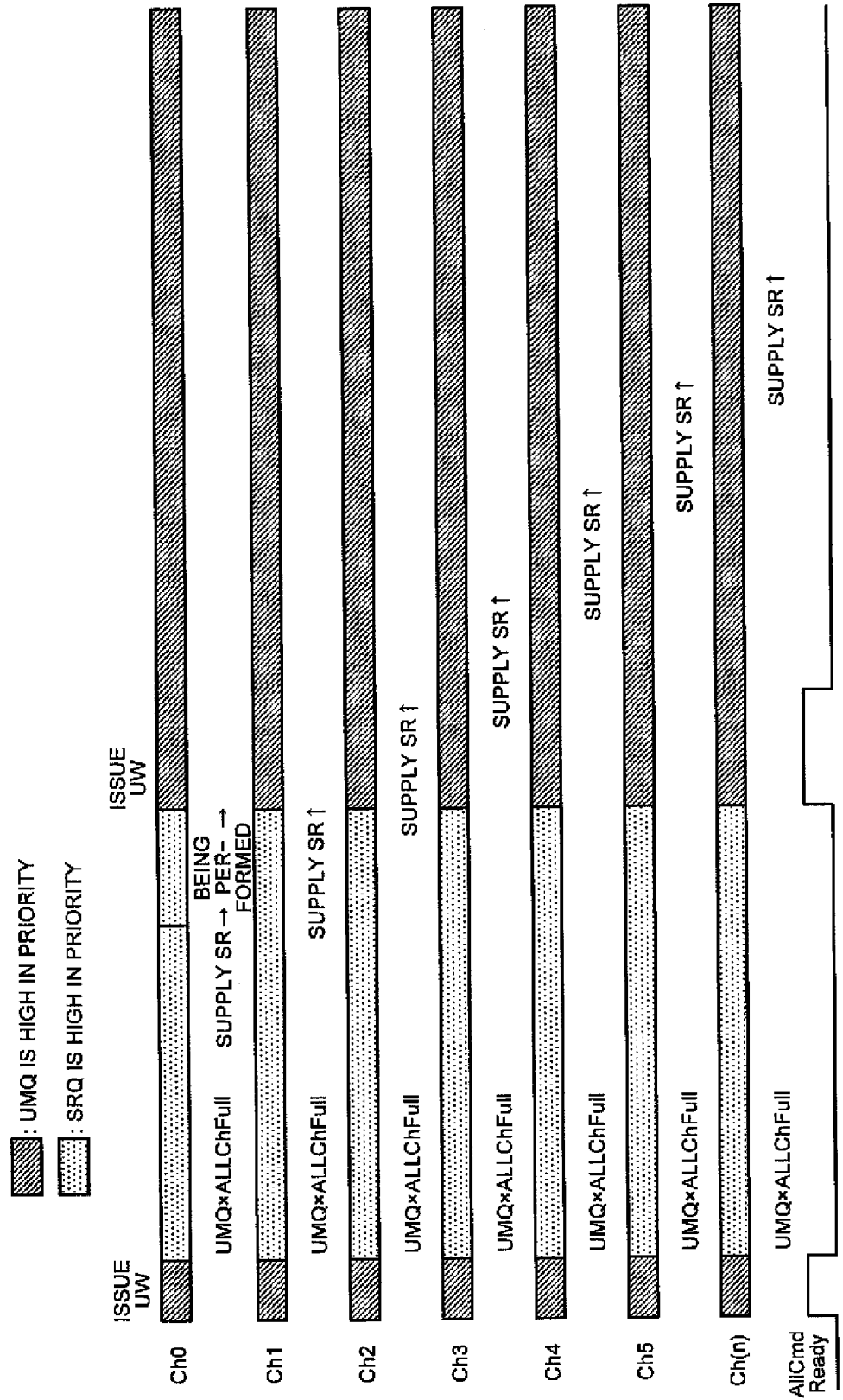

MEMORY CONTROL DEVICE, STORAGE DEVICE, AND MEMORY CONTROL METHOD

CROSS-REFERENCE TO RELATED APPLICATIONS

This application is based upon and claims the benefit of priority from Japanese Patent Application No. 2010-236549, filed Oct. 21, 2010, the entire contents of which are incorporated herein by reference.

FIELD

Embodiments described herein relate generally to a memory control device, a storage device, and a memory control method.

BACKGROUND

Various types of data storage devices have been developed conventionally. As for such a data storage device, for example, a solid state drive (SSD) using a NAND-type flash memory that is one type of a rewritable nonvolatile memory as a storage medium has been developed.

Such SSD performs writing and reading operations of data in logical access units referred to as "Page" or "cluster". To perform high-speed processing in such SSD, it is important to determine which operational timing a read/write is performed.

In recent years, a read/write tends to be performed on such SSD in multiple channels. In the conventional technology, the read/write timing suitable for the multiple channels is not taken into account.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 3 is an exemplary diagram illustrating the order of priority of commands issued in an issuing order determination circuit in the first embodiment;

FIG. 10 is an exemplary flowchart illustrating processes of writing and reading in a NAND flash controller in the second embodiment; and FIG. 11 is an exemplary diagram illustrating issuing timings of commands in accordance with switching of priority order in each of the channels in the second embodiment.

DETAILED DESCRIPTION

In general, according to one embodiment, a memory control device comprises: a plurality of queues in a plurality of channels, respectively; a first controller; a generator; and a second controller. Command processing is performed on a storage medium in the channels. The queues holds therein write commands for data pieces with respect to the storage medium. The first controller is configured to cause: (i) when a read command for a data piece with respect to the storage medium is received, and until the write commands are held in the queues in the channels, the channels are synchronized with each other, and until processes of the write commands become ready to be performed, a read process for the data piece based on the read command prior to the write commands; and, (ii) when the processes of the write commands become ready to be performed in the channels, synchronization of the channels with each other, and subsequently, write processes for the data pieces based on the write commands. The generator is configured to generate error correction codes for detecting and correcting errors of the data pieces written in the channels based on the data pieces to be written in the channels when the channels are synchronized with each other and the processes based on the write commands are performed. The second controller is configured to write the error correction codes on the storage medium.

Figure 1:
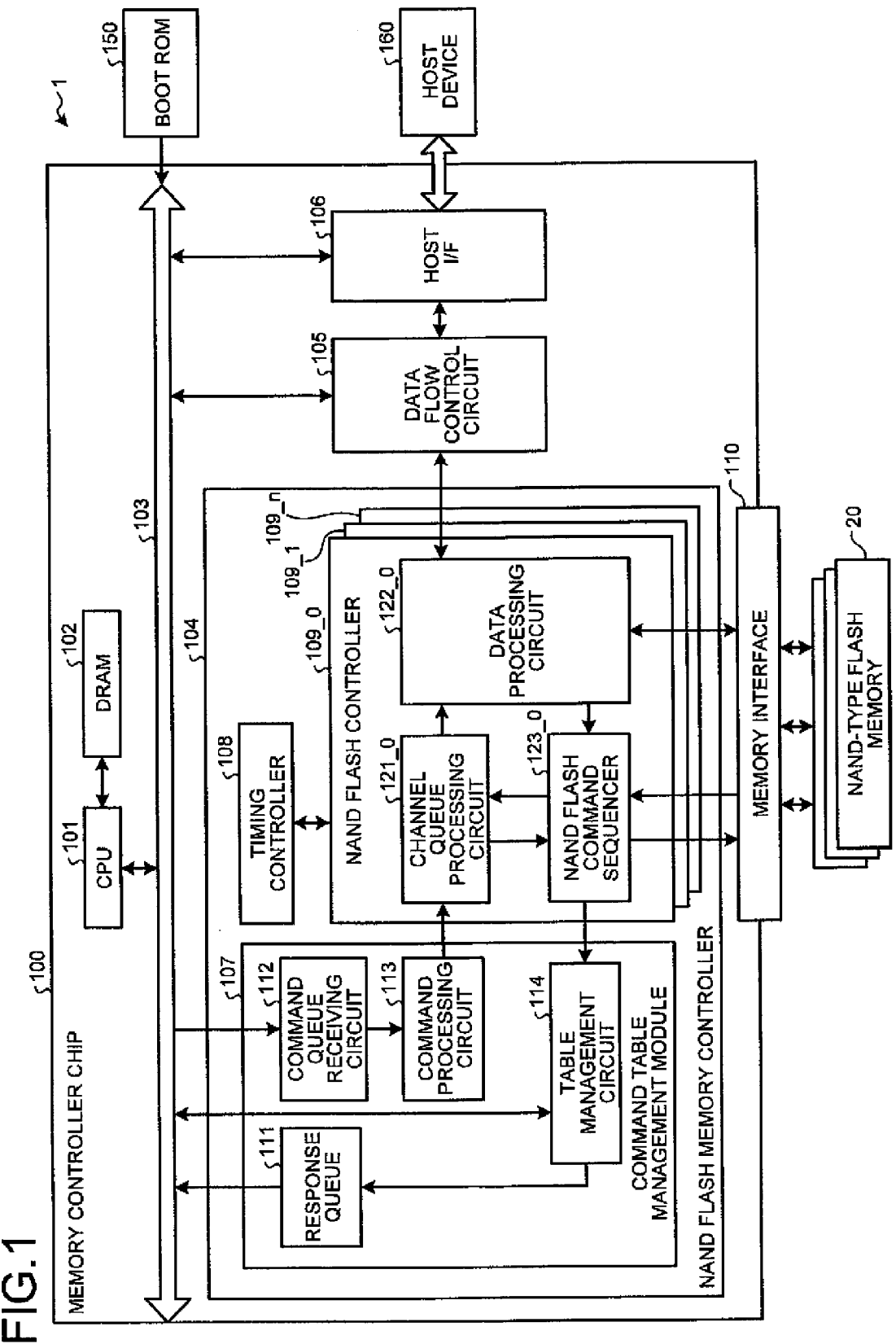
FIG. 1 is an exemplary block diagram of a configuration of a data storage device according to a first embodiment.

FIG. 1 is an exemplary block diagram of a configuration of a data storage device 1 according to a first embodiment. The data storage device 1 is a solid state drive (SSD) that uses a NAND-type flash memory 20 (hereinafter, referred to as a "flash memory") as a storage medium. As illustrated in FIG. 1, the data storage device 1 comprises a memory controller chip (hereinafter, referred to as a "controller") 100, a plurality of flash memories 20, and a boot read-only memory (ROM) 150. The data storage device 1 performs a reading and a writing of data, and the like in accordance with a command received from a host device 160.

The host device 160, for example, connects a personal computer and the SSD with each other. The host device 160 is, for example, an interface controller of the serial attached small computer system interface (SAS) standard or the serial advanced technology attachment (SATA) standard. The host device 160 performs an access by a logical block address (LBA).

The boot ROM 150 is composed of a flash memory, and stores therein a boot program that enables external access (for example, from the host device 160) to the SSD.

The NAND-type flash memory 20 is a readable and writable storage medium, and can be attached externally in channel (package) units. In the embodiment, in view of power consumption or the like, the number of the NAND-type flash memory 20 can be changed arbitrarily based on an instruction from firmware comprised in a CPU 101.

The controller 100 comprises a NAND flash memory controller 104 that performs control of an address and data on the flash memory 20, a memory interface 110, a host interface (I/F) 106, a data flow control circuit 105, a microprocessor (CPU) 101, a dynamic random access memory (DRAM) 102, and an internal bus 103.

The CPU 101 is a processor that controls the entire data storage device 1. The CPU 101 includes the firmware, and outputs a command for performing control of a writing operation and a reading operation of data to the NAND flash memory controller 104 based on a command issued from the host device 160.

The DRAM 102 is used as a work area for the CPU 101, and stores therein data to be written to and read from the NAND-type flash memory 20, table information, and the like based on access control performed by the CPU 101.

The memory interface 110 includes an input/output (I/O) buffer, and controls input and output of an address and data to and from the flash memory 20.

The host I/F 106 transfers data and a command to and from the host device 160.

The data flow control circuit 105 performs buffer control of data transferred by the host I/F 106.

The NAND flash memory controller 104 performs buffer control of data transferred by the host I/F 106.

The NAND flash memory controller 104 comprises a command table management module 107, a timing controller 108, and NAND flash controllers 109_0 to 109_$n$, and performs a reading/writing on the flash memory 20 in a plurality of channels.

The command table management module 107 comprises a response queue 111, a command queue receiving circuit 112, a command processing circuit 113, and a table management circuit 114.

The response queue 111 supplies command completion information and status information to the CPU 101.

The command queue receiving circuit 112 comprises a command queue (not illustrated), and receives a command from the CPU 101 to store the command in the command queue. The command queue is a waiting queue buffer, and stores therein write and read commands issued from the CPU 101. The command format used herein is a bit format that is easily processed by hardware. The issue of the queue to the command queue receiving circuit 112 is performed by the firmware in the CPU 101.

The command processing circuit 113 decodes and controls the commands such as the write command stored in the queue included in the command queue receiving circuit 112. The command supplied from the command processing circuit 113 is in cluster (4K-byte) units.

The command processing circuit 113 receives the transfer length of data from the command queue receiving circuit 112, and the physical block number and the chip number of target data from the table management circuit 114. The command processing circuit 113 then performs queuing of the write commands and the read commands on channel queue processing circuits 121_0 to 121_$n$ included in the NAND flash controllers 109_0 to 109_$n$ in the respective channels.

The table management circuit 114 updates the table information (e.g., a conversion table for an LBA and a physical address) stored in the DRAM 102.

The table management circuit 114 uses the LBA (logical block address) as an index, and refers to various tables from the DRAM 102 to calculate the physical block number and the chip number of target data.

The NAND flash controllers 109_0 to 109_$n$ are configured to perform control of an address and data on the plurality of NAND-type flash memory 20, and provided as many as the number of channels for accessing the NAND flash.

The NAND flash controller 109_0 comprises the channel queue processing circuit 121_0, a data processing circuit 122_0, and a NAND flash command sequencer 123_0. The NAND flash controllers 109_1 to 109_$n$ have the same configuration as that of the NAND flash controller 109_0.

The channel queue processing circuit 121_0 comprises various queues for performing command control in each of the channels, and receives the commands from the command processing circuit 113 to store the commands in the queues.

The data processing circuit 122_0 is a data transfer interface for the data flow control circuit 105 and the NAND-type flash memory 20. Furthermore, the data processing circuit 122_0 performs error detection processing and error correction processing (e.g., error correcting code (ECC) processing) on the data.

The NAND flash command sequencer 123_0 selects the NAND-type flash memory 20 from the plurality thereof, and issues an access command to the NAND-type flash memory 20.

The read operation and the write operation on the flash memory 20 performed by the data storage device 1 according to the embodiment will now be described.

In the read operation according to the embodiment, the command processing circuit 113 retrieves a read command queued in the command queue receiving circuit 112. The command processing circuit 113 then, for example, issues the command to the NAND flash command sequencer 123_0 to activate the NAND flash command sequencer 123_0 as an arbitrary channel. Subsequently, the NAND flash command sequencer 123_0 reads data from the NAND-type flash memory 20 via the memory interface 110. In the NAND-type flash memory 20, whether the data stored therein is valid is managed by a flag, and the read operation is performed on valid data in accordance with the flag. When accessing the NAND-type flash memory 20, the NAND flash command sequencer 123_0 requests the data processing circuit 122_0 to transfer the data to the DRAM 102. When the reading of the data is completed, the data processing circuit 122_0 returns a completion response to the NAND flash command sequencer 123_0.

In the write operation according to the embodiment, the command processing circuit 113 retrieves a write command queued in the command queue receiving circuit 112. The command processing circuit 113 then, for example, issues the command to the NAND flash command sequencer 123_0 to activate the NAND flash command sequencer 123_0 as an arbitrary channel. Subsequently, the NAND flash command sequencer 123_0 controls the writing of data to the NAND-type flash memory 20 via the memory interface 110. At this time, the NAND flash command sequencer 123_0 requests the data processing circuit 122_0 to transfer the data from the DRAM 102. The data processing circuit 122_0 then receives the target data to be written via the data flow control circuit 105. The data processing circuit 122_0 then writes the received data to the NAND-type flash memory 20 via the memory interface 110. After the reception and the writing of the data are completed, the data processing circuit 122_0 returns a completion response to the NAND flash command sequencer 123_0. Subsequently, the NAND flash command sequencer 123_0 transfers a completion notification and information required for updating the table to the table management circuit 114. This causes the table management circuit 114 to update data on the DRAM 102. Subsequently, the table management circuit 114 issues completion information and status information to the response queue 111. The CPU 101 then determines whether the write operation is normally completed with reference to the information. There are operations relating to other management tables and table update processing in an actual operation. However, because the conventional technique may be used for the operations, the description thereof is omitted.

In the embodiment, as described above, the NAND-type flash memory 20 is configured in a plurality of channels.

In the data storage device 1 according to the embodiment, when a read process is performed on the NAND-type flash memory 20, any one of the NAND flash controllers 109_0 to 109_$n$ issues a read command in accordance with the status of a target channel to be controlled. In this manner, the reading described above is performed in an arbitrary channel.

On the contrary, in the data storage device 1 according to the embodiment, when write processes are performed on the NAND-type flash memory 20, all of the NAND flash controllers 109_0 to 109_$n$ are synchronized with each other to issue write commands simultaneously. In this manner, the writing described above is performed in all of the channels.

To achieve such synchronization, the timing controller 108 controls the timing for synchronizing the write processes performed by the NAND flash controllers 109_0 to 109_$n$.

In this manner, in the data storage device 1 according to the embodiment, multi-channel access and single-channel access are performed depending on the types of the commands. The configuration for performing the command control will now be described.

Figure 2:
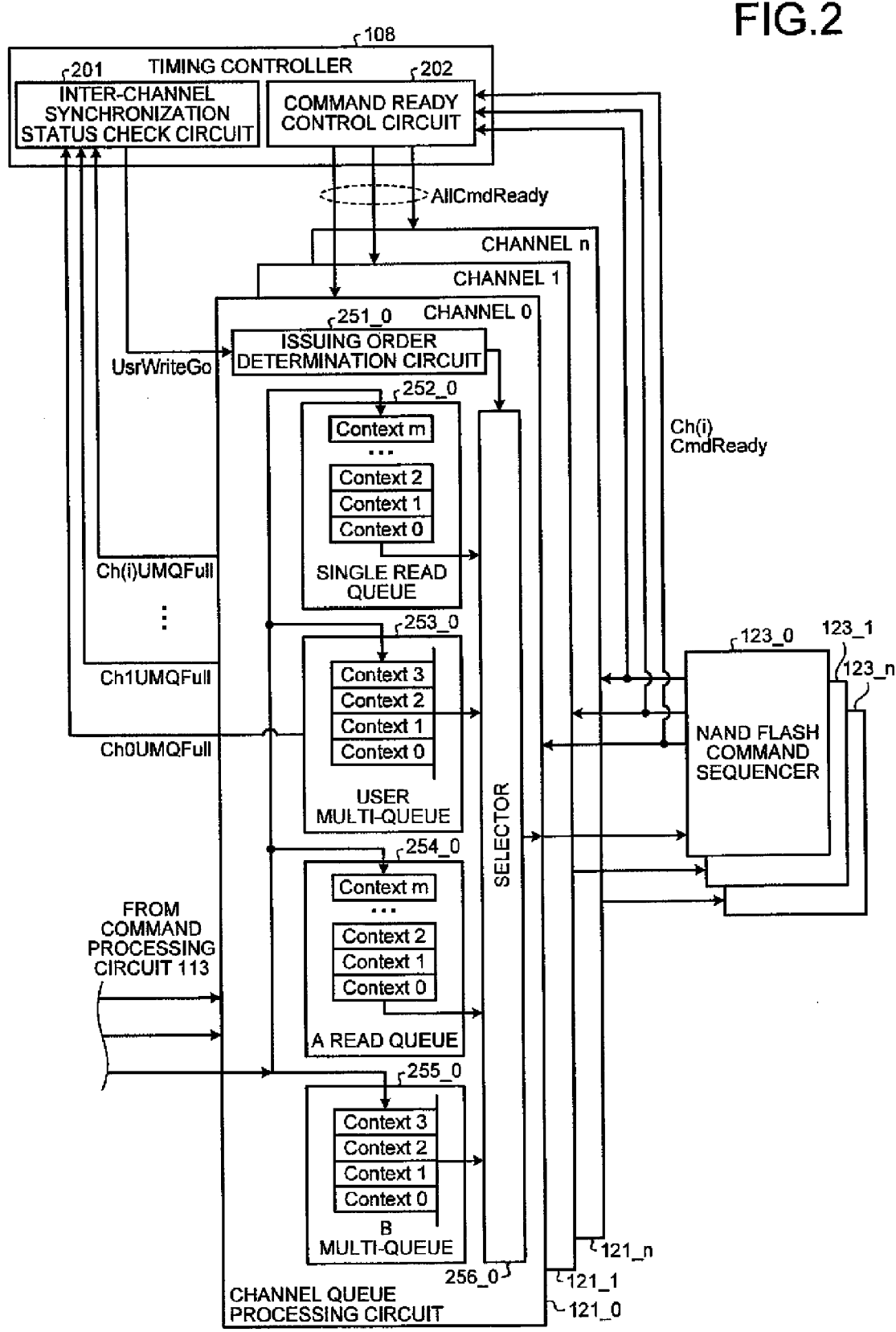
FIG. 2 is an exemplary diagram of a timing controller and an internal configuration of channel queue processing circuits in the first embodiment.

FIG. 2 is an exemplary view of the timing controller 108 and the internal configuration of the channel queue processing circuits 121_0 to 121_$n$ used for issuing a command to the flash memory 20.

The channel queue processing circuit 121_0 comprises an issuing order determination circuit 251_0, a single read queue 252_0, a user multi-queue 253_0, an A read queue 254_0, a B multi-queue 255_0, and a selector 256_0. The channel queue processing circuits 121_1 to 121_$n$ have the same configuration as that of the channel queue processing circuit 121_0.

The single read queue 252_0 is a queue that holds a read command to the NAND-type flash memory 20, and comprises Entry of 0 to m stages that enables efficient processing even if read access to the same channel coincides with each other. Furthermore, the single read queue 252_0 is a queue that holds a read command for reading user data.

In the embodiment, when at least one read command is stored in the single read queue 252_0 included in the channel queue processing circuit 121_0, the read command is ready to be issued. When the read command is issued to the NAND flash command sequencer 123_0, the queue for one Entry becomes vacant in the single read queue 252_0. This allows the next command to be received from the command processing circuit 113. The number of stages of the queues included in the single read queue 252_0 can be changed depending on required performance.

The user multi-queue 253_0 is a queue that retains a write command for user data to the NAND-type flash memory 20, and comprises Entry that can store therein contexts of stages (four stages in the embodiment) required for performing the writing in logical page units.

In the embodiment, the NAND-type flash memory 20 in which one logical page is 8 KB is used. In the embodiment, two clusters are equivalent to one page. When performing a multi-page write (also referred to as a "multi-plane write"), the channel queue processing circuit 121_0 according to the embodiment does not issue a write command to the NAND flash command sequencer 123_0 until commands of four clusters (Contexts 0-3) are stored in the user multi-queue 253_0. In other words, in the embodiment, when commands of four clusters are stored in the user multi-queue 253_$(i)$ ($i=1$ to $n$) in each of the channels, the channels are synchronized with each other and the writing control is performed.

When all of the contexts of four rows are filled with write commands, the user multi-queue 253_0 outputs a Ch0UMQFull="H" signal to an inter-channel synchronization status check circuit 201. By confirming whether a Ch(i) UMQFull="H" signal is received from each of the channels ($i=0$ to $n$), the inter-channel synchronization status check circuit 201 included in the timing controller 108 can check whether all of the contexts of the user multi-queue 253_$(i)$ in each of the channels are filled with the write commands.

The A read queue 254_0 is a queue that holds a read command issued in the data storage device 1 to perform compaction or the like, and comprises Entry of 0 to m stages.

The B multi-queue 255_0 is a queue that holds a write command issued in the data storage device 1 to perform compaction or the like, and comprises Entry that can store therein contexts of four stages.

The channel queue processing circuits 121_0 to 121_$n$ issue the commands to the NAND flash command sequencers 123_0 to 123_$n$ based on the commands stored in each of the queues. When each of the queues becomes vacant by issuing the commands, the command processing circuit 113 supplies the next command to the vacant queue.

The single read queue 252_$(i)$, the user multi-queue 253_$(i)$, the A read queue 254_$(i)$, and the B multi-queue 255_$(i)$ ($i=0$ to n) are provided to each of the channel queue processing circuits 121_0 to 121_$n$ in each of the channels.

The embodiment is one example of the configuration of the queues provided in the channel queue processing circuit 121_0, but the configuration is not limited thereby.

The issuing order determination circuit 251_0 determines which command to issue among the commands stored in the single read queue 252_0, the user multi-queue 253_0, the A read queue 254_0, and the B multi-queue 255_0.

FIG. 3 is an exemplary view illustrating priority order of the commands issued in the issuing order determination circuit 251_0. As illustrated in FIG. 3, when the commands in the queues are ready to be issued, the issuing order determination circuit 251_0 issues the commands stored in the queues in order of the B multi-queue 255_0, the A read queue 254_0, and the single read queue 252_0 and the user multi-queue 253_0.

When a read command for a data piece with respect to the flash memory 20 is stored in the single read queue 252_0 in the channel 0, and until write commands are held in all of the contexts in the user multi-queue 253_$(i)$ ($i=1$ to n) in all of the channels, the channels are synchronized with each other, and until processes of the write commands become ready to be performed, the issuing order determination circuit 251_0 controls the selector 256_0 such that a read process for the data piece based on the read command is performed prior to the processes of the write commands.

When the write commands are held in all of the contexts in the user multi-queue 253_$(i)$ (it is to be noted that, i represents 1 to n) in all of the channels, the channels are synchronized with each other, and the processes of the write commands become ready to be performed, that is, when a UsrWriteGo="H" signal is received from the inter-channel synchronization status check circuit 201, the issuing order determination circuit 251_0 performs the write processes for the data pieces based on the write commands stored in the user multi-queue 253_0 in the channel 0 by using the operational timing at which the signal is received as a trigger. By using the timing as a trigger to execute the write commands, the write processing can be performed with the write commands in each of the channels synchronized with each other.

When the queued write commands are ready to be issued in all of the channels, and when a read command is ready to be issued in an arbitrary channel, the timing controller 108 according to the embodiment determines the priority order of the commands for issuance of the command. In this manner, the read command can be prevented from waiting to be issued for a long time, whereby the performance in the issue of the read command can be enhanced.

The selector 256_0 selects the queue for issuing the command out of the single read queue 252_0, the user multi-queue 253_0, the A read queue 254_0, and the B multi-queue 255_0 based on the control performed by the issuing order determination circuit 251_0. In accordance with the selection, the command stored in the queue is output to the NAND flash command sequencer 123_0.

Figure 4:
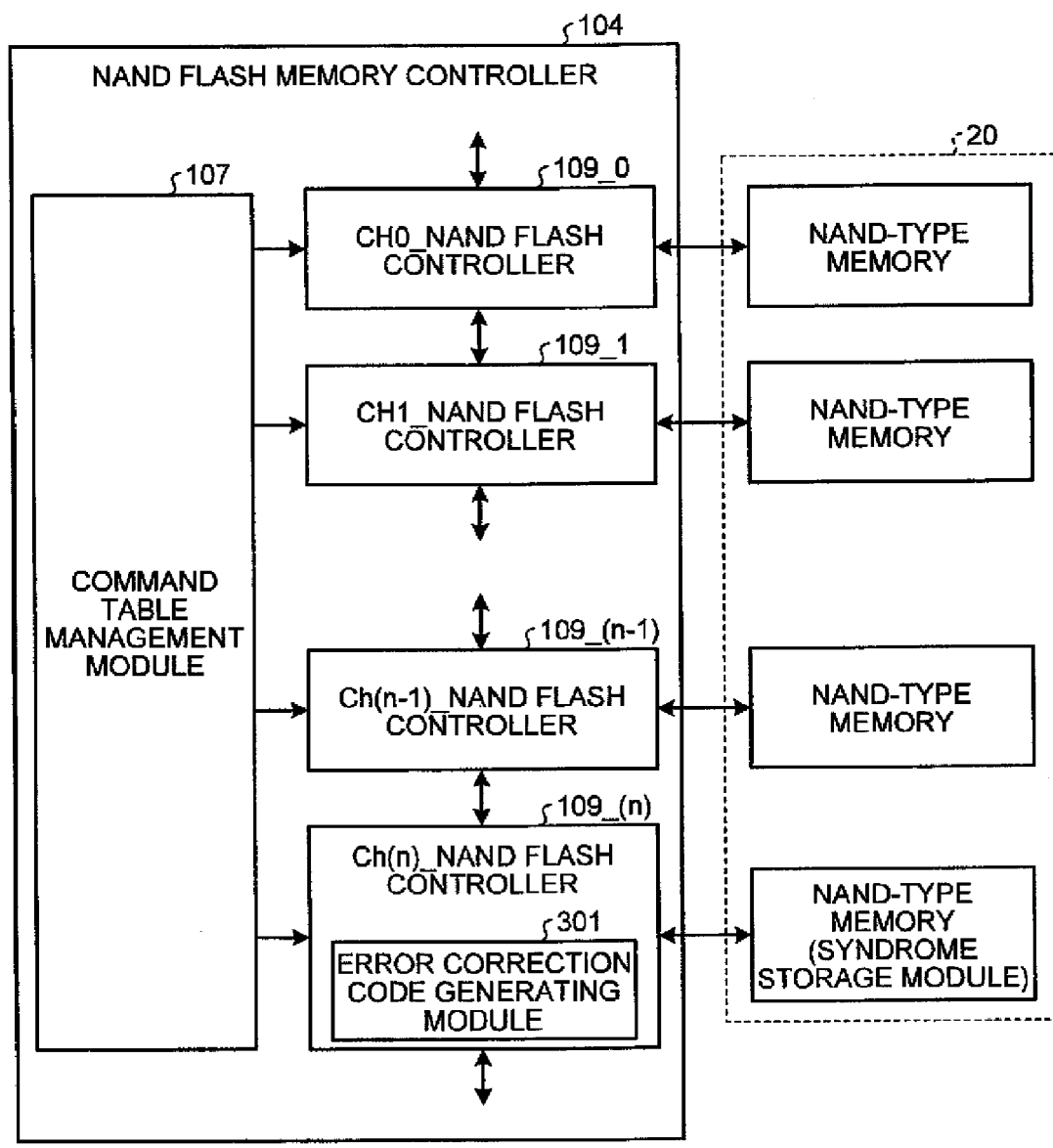
FIG. 4 is an exemplary diagram of a parallel configuration of NAND flash controllers in a plurality of channels in a data storage device in the first embodiment.

FIG. 4 is an exemplary view of a parallel configuration of NAND flash controllers 109_0 to 109_n in the data storage device 1 according to the embodiment.

In the data storage device 1 according to the embodiment, when the channels are synchronized with each other and the write processes are performed, a code used for detecting and correcting an error is generated based on each of the data pieces in each of the channels, and the code for correcting an error is written to the NAND-type flash memory 20. When the data is read, the code for correcting an error is also read to perform detection and correction of an error on the read data.

To realize the function described above, the NAND flash controllers 109_0 to 109_(n−1) write user data requested from the CPU 101 while the write control is performed.

The NAND flash controller 109_n comprises an error correction code generating module 301, and writes the code for correcting an error generated by the error correction code generating module 301 to a Syndrome storage module of the flash memory 20. The embodiment is only an example in which the generation and the writing of the error correction code are performed by the NAND flash controller 109_n. Thus, the generation and the writing may also be performed in other configurations.

When the processes based on the write commands synchronized with each other among the channel 0 to the channel n−1 are performed, the error correction code generating module 301 generates error correction codes for detecting and correcting errors of the data pieces written in the channel 0 to the channel n−1 based on the data pieces to be written in the channel 0 to the channel n−1.

In the data storage device 1 that synchronizes the channels to correct errors, the NAND flash command sequencer 123_(i) (i=1 to n) has to issue the command to the NAND-type flash memory 20 in all of the channels regularly during the writing. Therefore, in the embodiment, the commands are issued simultaneously in the channels.

For example, given n=6, one channel among the six channels is configured to be an encoded data storage memory. The NAND flash controller 109_(i) (i=0 to 4) of five channels issues four commands to the NAND flash command sequencer 123_(i), respectively. The error correction code generating module 301 then generates the codes for correcting errors by Syndrome calculation or the like from the target data to be written by 20 commands (4×5 channels).

The method for determining the priority order of the read command and the write commands to be issued according to the embodiment will now be described.

The commands are executed by the NAND flash controller 109_(i) (i=0 to n) in each of the channels in a parallel manner as illustrated in FIG. 4. The execution order of the commands between the channels is not guaranteed. In each of the channels, a multi-page write is performed by the write command, and a cluster read is performed by the read command.

As described above, until the write commands are stored in all of the contexts in the user multi-queue 253_(i) (i=0 to n), and the multi-page write is ready to be performed, the read command is executed preferentially. Therefore, the execution order of the commands is not guaranteed. With reference to FIG. 2, even if the commands are queued in order of Write context 0, Write context 1, and Read context 0 in the channel 0, for example, because all of the contexts in the user multi-queue 253_0 are not filled, the read command is executed prior to the write commands.

If the channels are synchronized with each other by using the conventional technology, at the time when four write commands are queued in the user multi-queue 253_(i) in each of the channels to fill Entry, the write commands in that channel are provided with high priority. However, because all of the channels need to be synchronized with each other for the write commands to be issued, even if Entry is filled in one of the channels, the write commands are not issued until Entries in all of the channels are filled. As a result, when a read command is queued before Entries in all of the channels are filled, the read command which is ready to be issued has to wait for a long time.

To address this, in the embodiment, the timing at which each of the commands is provided with high priority is adjusted in the timing controller 108 illustrated in FIG. 2.

The timing controller 108 illustrated in FIG. 2 comprises the inter-channel synchronization status check circuit 201 and a command ready control circuit 202.

The inter-channel synchronization status check circuit 201 can check whether all of the contexts of the user multi-queue 253_(i) in all of the channels are filled with the write commands based on a Ch(i)UMQFull signal received from the user multi-queue 253_(i) (i=1 to n) in each of the channels. The Ch(i)UMQFull signal is a signal indicating that Entry of each of the channels is filled.

When confirming that Entry of the user multi-queue 253_(i) in all of the channels is filled, the inter-channel synchronization status check circuit 201 outputs a UsrWriteGo="H" signal to the issuing order determination circuit 251_(i) in each of the channels.

When receiving the UsrWriteGo="H" signal, the issuing order determination circuit 251_(i) of the channel queue processing circuit 121_(i) in each of the channels recognizes that Entries in all of the channels are filled with the write commands. The issuing order determination circuit 251_(i) then determines which command to issue based on the recognition. This determination is made for preventing the following problem: if the write commands are given high priority unconditionally at the time when Entries in all of the channels are filled with the write commands, the read command cannot be issued in the case where Entries are kept filled with the write commands.

In the data storage device 1 according to the embodiment, when Entries in all of the channels are filled with the write commands, and when a read command is stored in Entry in an arbitrary channel, the issuing order determination circuit 251_(i) (i=1 to n) in each of the channels alternatively switches the priority order between the single read queue 252_(i) and the user multi-queue 253_(1) using a round-robin. That is to say, the priority order is switched when both of the read command and the write commands are ready to be issued. In this manner, the read command can be prevented from waiting to be issued for a longtime during the reception of the write commands.

After the single read queue 252_(i) is given higher priority, when the channel queue processing circuit 121_(i) in each of the channels receives a Ch(i)CmdReady signal from the NAND flash command sequencer 123_(i) to recognize that the command is ready to be issued, the issuing order determination circuit 251_(i) controls the selector 256_(i) such that the read command is issued. When a (single) read (SR) command is issued, the issuing order determination circuit 251_(i) then sets the user multi-queue 253_(i) to be given higher priority so as to execute the write commands preferentially.

When the user multi-queue 253_(i) is provided with higher priority, after the channel queue processing circuit 121_(i) in each of the channels receives the UsrWriteGo signal from the inter-channel synchronization status check circuit 201 to recognize that Entries of the user multi-queues 253_0 to 253_n in all of the channels are filled, the is suing order determination circuit 251_(i) synchronizes all of the channels using an AllCmdReady signal, and then controls the selector 256_(i) such that the write commands are issued.

Figure 5:
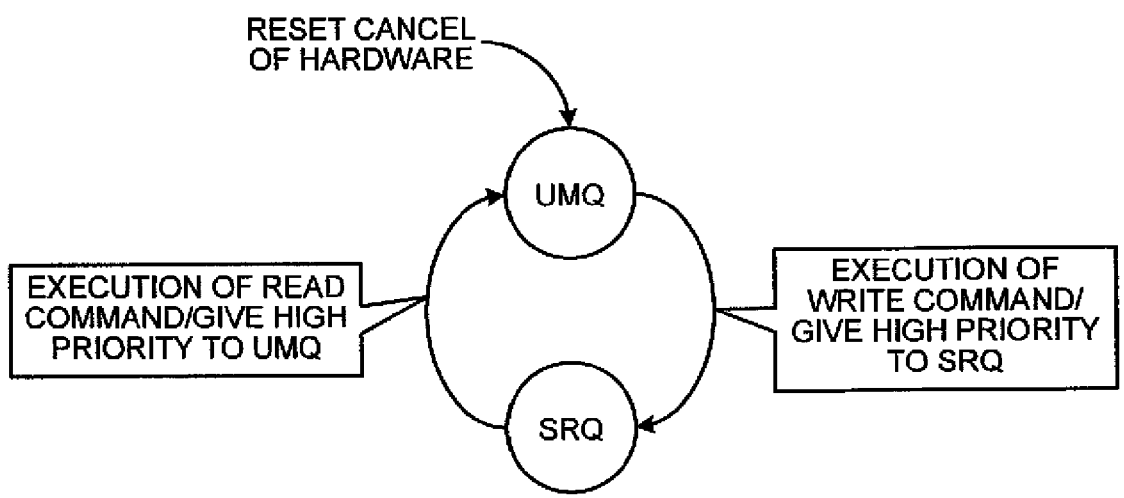
FIG. 5 is an exemplary diagram for explaining switching of the priorities of queues in each of the channels when both of a read command and write commands are ready to be issued, in the first embodiment.

FIG. 5 is an exemplary diagram for explaining switching of the priorities of the queues in each of the channels when both of the read command and the write commands are ready to be issued. When the data storage device 1 performs reset cancel of the hardware, the issuing order determination circuit 251_(i) gives higher priority to the user multi-queue 253_(i) as a default value.

As illustrated in FIG. 5, in the channel queue processing circuit 121_(i) (i=1 to n) in each of the channels, when the user multi-queue (UMQ) 253_(i) is provided with higher priority, the issuing order determination circuit 251_(i) gives higher priority to the single read queue (SRQ) 252_(i) after the write commands are issued.

Alternatively, when the single read queue (SRQ) 252_(i) is provided with higher priority, the issuing order determination circuit 251_(i) gives higher priority to the user multi-queue (UMQ) 253_(i) after the read command is issued.

In this manner, the priority order of the user multi-queue 253_(i) and the single read queue 252_(i) are switched every time the NAND flash command sequencer 123_(i) issues the command.

When the command ready control circuit 202 receives the Ch(i)CmdReady signal from all of the NAND flash command sequencers 123_0 to 123_n to recognize that the commands are ready to be issued, the command ready control circuit 202 outputs the AllCmdReady signals to all of the channels to notify that the commands are ready to be issued in all of the channels (AllCmdReady="H"). In this manner, the write commands are issued in synchronization in all of the channels.

Figure 6:
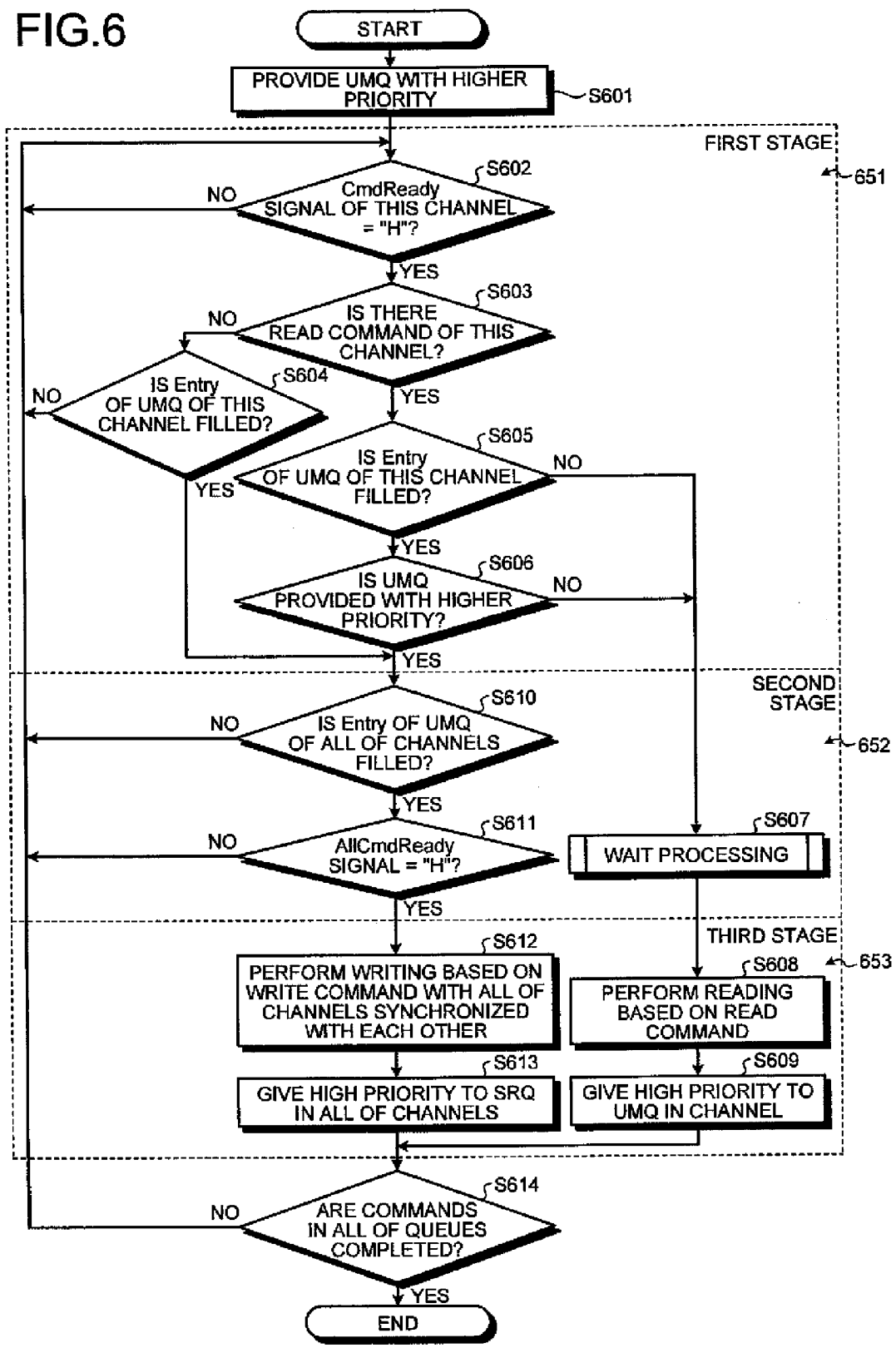
FIG. 6 is an exemplary flowchart of processes of reading and writing in the NAND flash controller in the first embodiment.

The read and write processing performed in the NAND flash controllers 109_0 to 109_n of the data storage device 1 according to the embodiment will now be described. FIG. 6 is an exemplary flowchart illustrating the processing described above in the NAND flash controllers 109_0 to 109_n according to the embodiment.

As illustrated in FIG. 6, the processing for the reading and the writing is managed by a number of stages. As illustrated in FIG. 6, the processing is composed of a first stage 651, a second stage 652, and a third stage 653. The processing in the stages is performed in accordance with the clock cycle of the CPU 101. In other words, in accordance with the clock cycle of the CPU 101, the processing is performed in the first stage 651, the second stage 652, and the third stage 653 in this order, and the system control is returned to the first stage 651. In this manner, the processing in each of the stages is performed repeatedly in order of the stages in accordance with the clock cycle (in order of the first stage 651, the second stage 652, the third stage 653, the first stage 651, the second stage 652, the third stage 653, and the first stage 651). In the first stage 651, the priority order for determining the command to be executed in each of the channels is determined. In the second stage 652, all of the channels are synchronized with each other. In the third stage 653, the commands are practically issued to the sequencer. The processing in each of the stages will now be described.

At first, before execution of the processing in each of the stages, the issuing order determination circuit 251_(i) in the NAND flash controller 109_(i) (i=0 to n) provides higher priority to the user multi-queue (UMQ) 253_(i) as the default value (S601).

Next, as for the first processing in the first stage 651, the channel queue processing circuit 121_(i) (i=0 to n) in each of the channels determines whether the Ch(i)CmdReady signal="H" is received from the NAND flash command sequencer 123_(i) (S602). If the Ch(i)CmdReady signal="H" is not received, that is, if the AllCmdReady signal="L" is received (No at S602), the subsequent processing (processing in the second stage 652 and the third stage 653) is not performed in the channel, and the system control is returned to S602.

On the contrary, if the Ch(i)CmdReady signal="H" is received (Yes at S602), the processing is changed depending on whether a read command is held in the single read queue 252_(i) in the channel (S603). If the read command is not stored in the single read queue 252_(i) (No at S603), the processing is switched depending on whether Entry of the user multi-queue 253_(i) is filled (S604). If Entry of the user multi-queue 253_(i) is not filled (No at S604), the subsequent processing (processing in the second stage 652 and the third stage 653) is not performed, and the system control is returned to S602. If Entry of the user multi-queue 253_(i) is filled (Yes at S604), the user multi-queue 253_(i) outputs the Ch(i)UMQFull="H" signal to the inter-channel synchronization status check circuit 201, and the system control goes to the processing at S610 in the second stage 652.

At S603, if a read command is stored in the single read queue 252_(i) (Yes at S603), the processing is switched depending on whether Entry of the user multi-queue 253_(i) is filled (S605). If Entry of the user multi-queue 253_(i) is not filled (NO at S605), the system control goes to S607 in the second stage 652. If Entry of the user multi-queue 253_(i) is filled (Yes at S605), the user multi-queue 253_(i) outputs the Ch(i)UMQFull="H" signal to the inter-channel synchronization status check circuit 201. In this state, because both of the write commands and the read command are stored in the channel, it is necessary to determine which command to give higher priority. Therefore, the issuing order determination circuit 251_(i) in each of the channels determines whether the user multi-queue (UMQ) 253_(i) is to be provided with higher priority (S606). If the issuing order determination circuit 251_(i) determines that the user multi-queue (UMQ) 253_(i) is provided with higher priority (Yes at S606), the system control goes to the processing at S610 in the second stage 652. On the contrary, if the issuing order determination circuit 251_(i) determines that the user multi-queue (UMQ) 253_(i) is not provided with higher priority, that is, determines that the single read queue 252_(i) is provided with higher priority (No at S606), the system control goes to S607 in the second stage.

Next, in accordance with the clock cycle of the CPU 101, the processing in the second stage 652 is performed. If Entry of the user multi-queue 253_(i) is filled at S604 (Yes at S604), or if the user multi-queue (UMQ) 253_(i) is determined to be higher in priority at S606 (Yes at S606), by determining whether the UserWriteGo signal="H" is received, the issuing order determination circuit 252_(i) in each of the channels determines whether Entries of the user multi-queues (UMQ) 253_1 to 253_n in all of the channels are filled (S610). If the issuing order determination circuit 252_(i) determines that Entries of the user multi-queues (UMQ) 253_1 to 253_n in all of the channels are not filled (No at S610), the system control is returned to S602 without performing the processing in the third stage. In this manner, if Entries of the user multi-queues (UMQ) 253_1 to 253_n in all of the channels are not filled, the system control is returned to S602 in the first stage 651 to repeat the processing. Therefore, if there is a channel that receives a read command while Entries of the user multi-queues (UMQ) 253_1 to 253_n are not filled, the read command can be issued in that channel.

On the contrary, if the issuing order determination circuit 252_(i) in each of the channels determines that Entries of the user multi-queues (UMQ) 253_1 to 253_n in all of the channels are filled by receiving the UserWriteGo signal="H" (Yes at S610), the issuing order determination circuit 252_(i) determines whether the AllCmdReady signal="H" is received from the command ready control circuit 202 (S611). If the AllCmdReady signal="H" is not received (No at S611), the system control is returned to S602 in the first stage 651 without performing the processing in the third stage. If the AllCmdReady signal="H" is received (Yes at S611), the system control goes to S612 in the third stage 653.

In the first stage 651, if Entry of the user multi-queue 253_(i) is not filled at S605 (No at S605), or if the user multi-queue (UMQ) 253_(i) is determined to be lower in priority at S606 (No at S606), wait processing is performed in the channel in accordance with the clock cycle of the CPU 101 in the second stage 652 (S607).

In the second stage 652, if the issuing order determination circuit 252_(i) in each of the channels receives the AllCmdReady signal="H" (Yes at S611), the issuing order determination circuits 251_0 to 251_n in all of the channels control the selector 256_(i) corresponding thereto such that the user multi-queue 253_(i) issues the commands in the third stage 653. In this manner, the NAND flash command sequencers 123_0 to 123_n in all of the channels perform the write processes based on the write commands with all of the channels synchronized with each other (S612). Subsequently, the issuing order determination circuits 251_0 to 251_n in all of the channels provides higher priority to the single read queue 252_(i) (i=0 to n) (S613).

If the wait processing is performed in accordance with the clock cycle of the CPU 101 in the second stage 652 (S607), the NAND flash command sequencer 123_(i) performs the read processes based on the read command in the third stage 653 (S608). Subsequently, the issuing order determination circuit 251_(i) in the channel provides higher priority to the user multi-queue (UMQ) 253_(i) in the channel (S609).

After the processing in the third stage 653, if the processes of the commands in all of the queues is not completed in the NAND flash controller 109_(i) (i=0 to n) in all of the channels (No at S614), the system control is returned to S602 in the first stage 651. If the processes of the commands in all of the queues is completed (Yes at S614), the whole processing is ended.

In the embodiment, the processes are managed in the stages. However, the embodiment is not limited thereto, and the processes may be managed by other methods as long as the read command is issued if the read command is received before the user multi-queue (UMQ) 253 is filled, and when the read command and the write commands are ready to be issued, it is determined by a round-robin which command to issue.

In the embodiment, the switching of priority order, the write processes, and the read process are performed by the processing described above.

Figure 7:
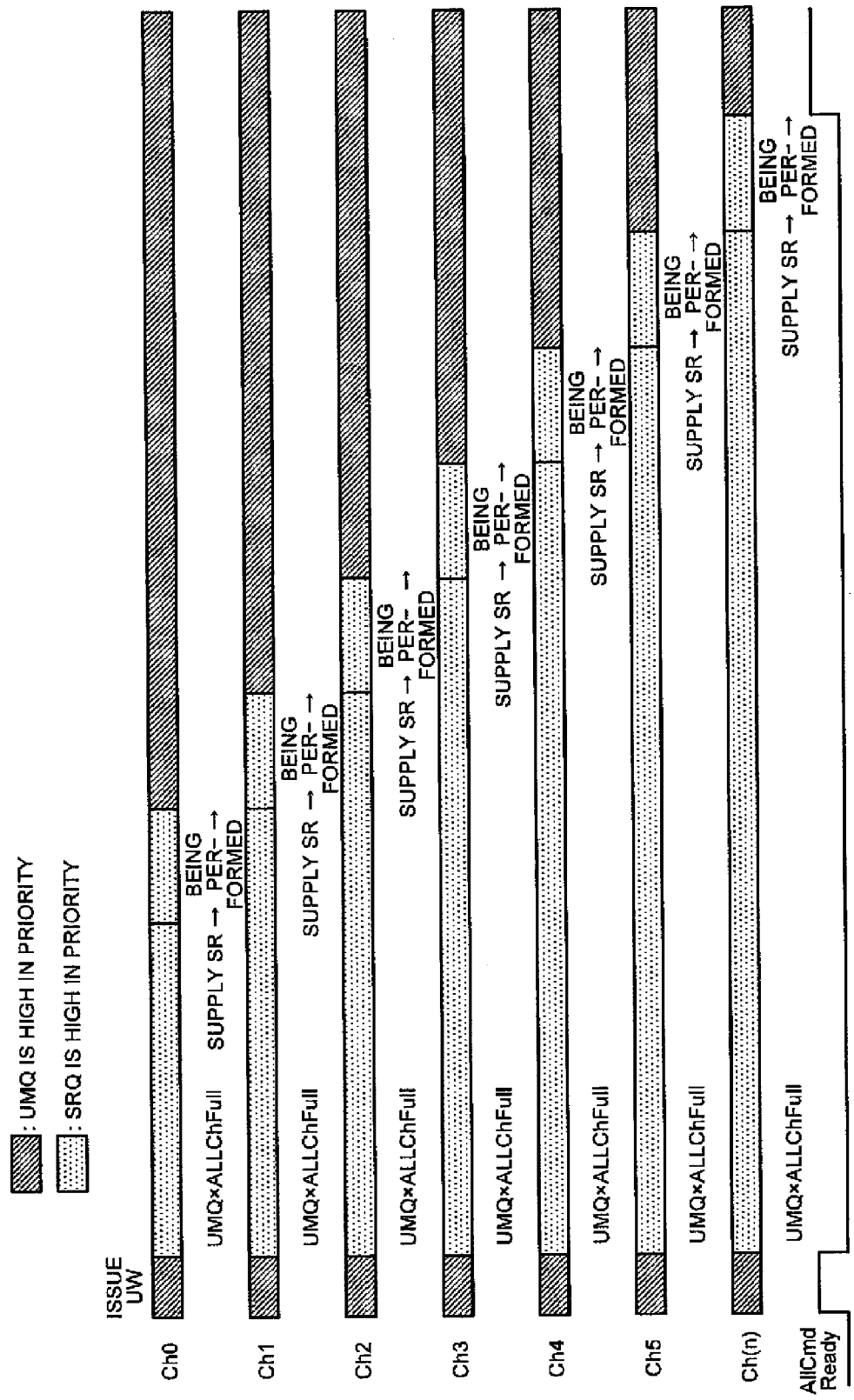
FIG. 7 is an exemplary diagram illustrating issuing timings of commands in accordance with switching of priority order in each of the channels according to the first embodiment.

FIG. 7 is an exemplary view illustrating issuing timings of the commands in accordance with the switching of the priority order in each of the channels according to the first embodiment.

(1) The user multi-queue 253_(i) (i=1 to n) issues write commands (UW) for user data to the NAND flash command sequencer 123_(i), whereby the single read queue 252_(i) is provided with higher priority. At this time, a writing operation is being performed on the NAND-type flash memory 20.

(2) In this state, even if write commands for new user data is supplied and all Entries in all channels are filled, the ALLCmdReady signal that is a logical AND of the Ch(i)CmdReady in all of the channels becomes "H" (the commands in all of the channels are completed) and the issuance of the write commands for the user data is waited until the write commands become able to be issued.

(3) Here, the single read queue 252_(i) is provided with higher priority and a read command can be executed independently in each of the channels in (1). Therefore, when a read command is stored in the single read queue 252_(i) of the channel queue processing circuit 121_(i), the issuing order determination circuit 251_(i) controls the single read command to be issued at an operational timing at which the preparation for issuing the command is completed in each of the channels (operational timing at which the Ch(i)CmdReady="H" is received), that is, an operational timing at which the write processes in the channel is completed.

(4) Because the single read queue 252_(i) is provided with higher priority in each of the channels, the issuing order determination circuit 251_(i) can control the single read command to be issued at least once in each of the channels. Every time the read command is issued in each of the channels, the user multi-queue 253_(i) in the channel is provided with higher priority. At the time when the single read commands are issued up to a number of n channels, the user multi-queue 253_(i) in all of the channels is provided with higher priority. When the reading in all of the channels is completed, the AllCmdReady signal output from the command ready control circuit 202 becomes "H". At the operational timing of the reception of the AllCmdReady signal="H", the issuing order determination circuit 251_(i) in all of the channels controls the write commands for the user data to be issued.

If the read command stops to be supplied in each of the channels and the reading in all of the channels is completed before the read commands are issued in all of the channels, the AllCmdReady signal output from the command ready control circuit 202 becomes "H". In this case, at the operational timing of the reception of the AllCmdReady signal="H", the issuing order determination circuit 251_(i) in all of the channels provides higher priority to the user multi-queue 253_(i), and issues the write commands for the user data.

In the embodiment, the write commands in all of the channels are executed simultaneously to be synchronized with each other. However, the embodiment is not limited thereto. In a data storage device that permits issue of a write command every time the write command is supplied, the issued write command in each of the channels and data to be written may be cached temporarily in a static RAM (SRAM) or the like. Then, at the time when the write commands and the data in all of the channels are accumulated, an error correction code may be generated. In this manner, even if the commands are not executed simultaneously, it is sufficient that synchronization control is performed so as to synchronize the write commands and the data in all of the channels.

In the data storage device 1 according to the embodiment, the priority order of the queued commands to be issued is determined by the round-robin. In this manner, the read processes and the write processes can be performed evenly each without waiting for a long time.

In the data storage device 1 according to the embodiment, when the write commands are ready to be issued in all of the channels and a read command is ready to be issued in an arbitrary channel, the priority order is switched using the round-robin, thereby preventing the read command from being waited for issuance for a long time, and enhancing the performance in the issuance of the read command.

In the first embodiment, as illustrated in FIG. 7, when the single read command is supplied in each of the channels sequentially, the single read queue 252_$(i)$ (i=1 to n) is kept higher in priority, resulting in the delay in the operational timing for giving higher priority to the user multi-queue 253_$(i)$. Therefore, in a second embodiment, an example in which the operational timing for giving higher priority to the user multi-queue 253_$(i)$ is changed is explained.

Figure 8:
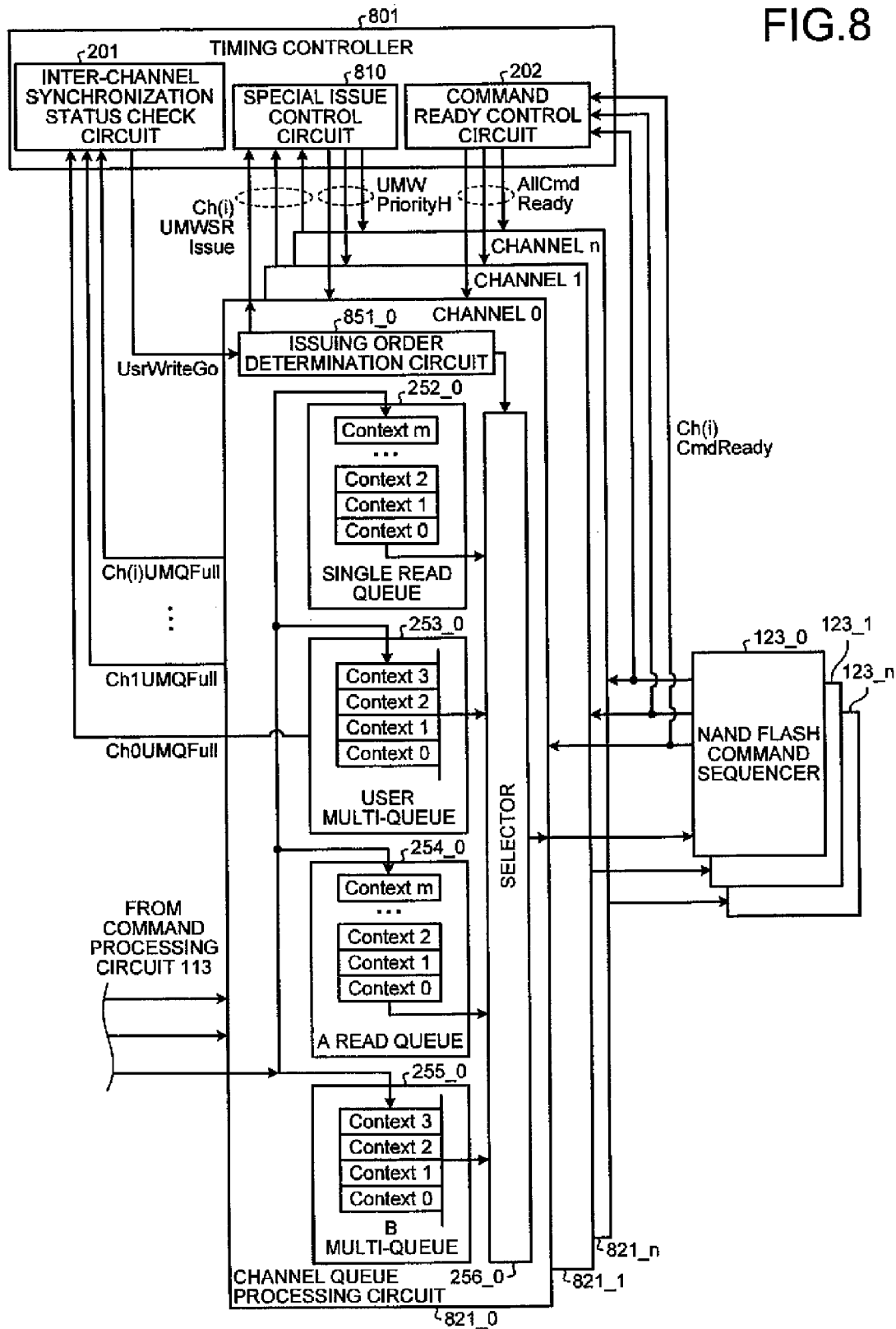
FIG. 8 is an exemplary view of a timing controller and an internal configuration of channel queue processing circuits according to a second embodiment.

FIG. 8 is an exemplary view of the configuration of a timing controller 801 and channel queue processing circuits 821_0 to 821_$n$ according to the second embodiment. The data storage device 1 according to the second embodiment has the same configuration as that of the first embodiment except that the timing control circuit 108 and the channel queue processing circuits 121_0 to 121_$n$ according to the first embodiment are replaced with the timing controller 801 and the channel queue processing circuits 821_0 to 821_$n$, respectively. Therefore, the description thereof will be omitted.

Compared with the channel queue processing circuit 121_0 according to the first embodiment, in the channel queue processing circuit 821_0, the issuing order determination circuit 251_0 is replaced with an issuing order determination circuit 851_0 that performs processing different therefrom.

The issuing order determination circuit 851_0 not only performs the same processing as that of the issuing order determination circuit 251_0 according to the first embodiment, but also, when a UsrWriteGo="H" signal is received, and a read command is issued from the single read queue 252_$(i)$, notifies the fact to a special issue control circuit 810 by a Ch(i)UMWSRIssue signal.

Compared with the timing control circuit 108 according to the first embodiment, the timing control circuit 801 has a configuration in which the special issue control circuit 810 is added.

When a read command is issued in an arbitrary channel among all of the channels (that is, when the fact is received from the issuing order determination circuit 851_$(i)$ by the Ch(i)UMWSRIssue), the special issue control circuit 810 according to the second embodiment provides higher priority to the user multi-queue 253_$(i)$ in all of the channels.

Figure 9:
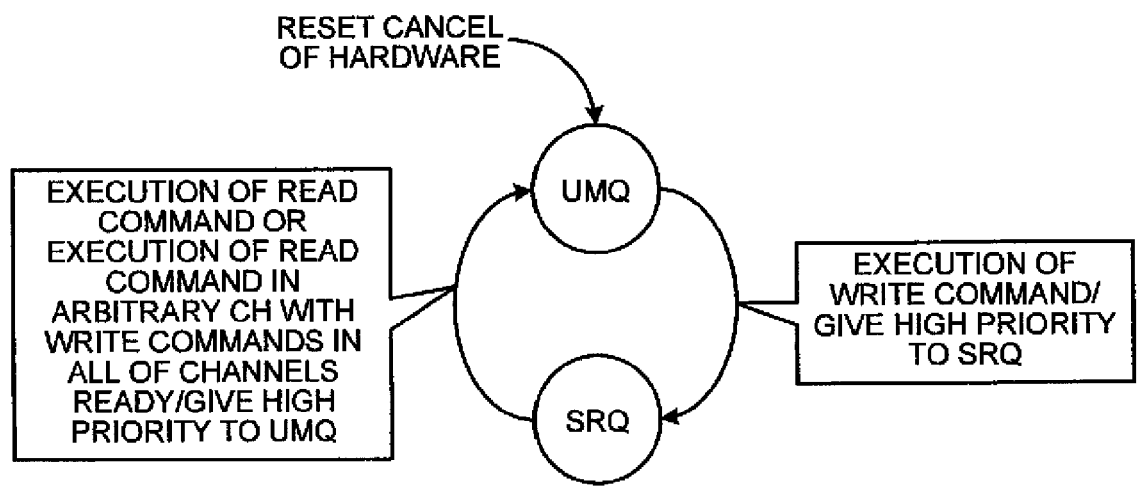
FIG. 9 is an exemplary view for explaining switching of priorities of queues in each of the channels in the second embodiment.

FIG. 9 is an exemplary view for explaining switching of the priorities of the queues in each of the channels according to the second embodiment. When the data storage device 1 performs reset cancel of the hardware, the issuing order determination circuit 851_$(i)$ provides higher priority to the user multi-queue 253_$(i)$ as a default value.

As illustrated in FIG. 9, in the channel queue processing circuit 821_$(i)$ (i=1 to n) in each of the channels, when the user multi-queue (UMQ) 253_$(i)$ is provided with higher priority, the issuing order determination circuit 851_$(i)$ provides higher priority to the single read queue (SRQ) 252_$(i)$ after the write commands are issued.

Alternatively, when the single read queue (SRQ) 252_$(i)$ is provided with higher priority, the issuing order determination circuit 851_$(i)$ provides higher priority to the user multi-queue (UMQ) 253_$(i)$ after the read command is issued.

Furthermore, in the case where the single read queue (SRQ) 252_$(i)$ is provided with higher priority, when the write commands are ready to be issued in all of the channels, and a read command is executed in an arbitrary channel, the issuing order determination circuits 851_0 to 851_$n$ in all of the channels provide higher priority to the user multi-queues 253_0 to 253_$n$, respectively.

In other words, when the UsrWriteGO signal is received from the inter-channel synchronization status check circuit 201, and the read command is issued from the single read queue 252_$(i)$, the issuing order determination circuit 851_$(i)$ in an arbitrary channel notifies the fact to the special issue control circuit 810 by the Ch(i)UMWSRIssue. The special issue control circuit 810 having received the notification then notifies all of the channels to provide higher priority to the user multi-queue 253_$(i)$ by a UMWPriorityH signal. In this manner, in all of the channels, the user multi-queues 253_0 to 253_$n$ are provided with higher priority.

As described above, in the second embodiment, one transition condition to provide higher priority to the user multi-queue 253_$(i)$ is added. In the data storage device 1 according to the second embodiment, when the added transition condition is satisfied, the user multi-queues 253_0 to 253_$n$ in all of the channels are provided with higher priority. Therefore, as soon as the issue of the command is ready, the write commands are issued immediately. In other words, even if a read command is ready to be issued, the read command is not issued because the user multi-queues 253_0 to 253_$n$ are provided with higher priority.

The read process and write processes performed in the NAND flash controllers 109_0 to 109_$n$ of the data storage device 1 according to the second embodiment will now be described. FIG. 10 is an exemplary flowchart illustrating the process of the processing described above in the NAND flash controllers 109_0 to 109_$n$ according to the embodiment.

In the second embodiment, the same processing as that of the processing illustrated in FIG. 6 of the first embodiment with the exception of S609 (S601 to S608, and S610 to S614) is performed (S1001 to S1008, and S1010 to S1014).

After the read process based on a read command is performed in an arbitrary channel (i) at S1008, instead of the processing at S609 of the first embodiment, the issuing order determination circuit 851_$(i)$ notifies the special issue control circuit 810 that the read command is issued by the Ch(i) UMWSRIssue signal. This causes the special issue control circuit 810 to notify all of the channels to provide higher priority to the user multi-queue 253_$(i)$ by the UMWPriorityH signal. In this manner, in all of the channels, the user multi-queues 253_0 to 253_$n$ are provided with higher priority (S1009).

In a first stage 1051, a second stage 1052, and a third stage 1053 of the second embodiment, the processing is performed in accordance with the clock cycle of the CPU 101 in the same manner as that in the first stage 651, the second stage 652, and the third stage 653 of the first embodiment.

In the embodiment, the switching of the priority order, the write processes, and the read process are performed by the processing described above.

FIG. 11 is an exemplary view illustrating issuing timings of the commands in accordance with the switching of the priority order in each of the channels according to the second embodiment. In the example illustrated in FIG. 11, each single read command is supplied at the same operational timings as those in the example illustrated in FIG. 7.

(1) The user multi-queue 253_(i) issues write commands (UW) for user data to the NAND flash command sequencer 123_(i), whereby the single read queue 252_(i) (i=1 to n) is provided with higher priority. At this time, write processes are performed on the NAND-type flash memory 20.

(2) In this state, even if write commands for new user data are supplied and all Entries in all channels are filled, the ALLCmdReady signal that is a logical AND of the Ch(i) CmdReady in all of the channels becomes "H" (the commands in all of the channels are completed) and issuance of the write commands for the user data is waited until the write commands become ready for issuance.

(3) Here, the single read queue 252_(i) is provided with higher priority, and a read command can be executed independently in each of the channels in (1). Therefore, when a read command is stored in the single read queue 252_(i) of the channel queue processing circuit 821_(i), the read command can be executed independently in each of the channels. Accordingly, at an operational timing at which the preparation for issuing the command is completed in each of the channels (operational timing at which the Ch(i) CmdReady="H" is received), that is, an operational timing at which the write processes in the channel is completed, the issuing order determination circuit 851_(i) controls a single read command to be issued because the single read queue 252_(i) is provided with higher priority.

(4) In the case where the single read command is issued in (3), if the UserWriteGo signal is supplied to the issuing order determination circuit 851_(i) having controlled the issue, the issuing order determination circuit 851_(i) outputs the Ch(i) UMWSRIssue signal to the special issue control circuit 810.

(5) Because the special issue control circuit 810 is logically ORed with the Ch(i)UMWSRIssue in all of the channels, the special issue control circuit 810 outputs a signal for providing higher priority to the user multi-queue 253_(i) (UMWPriorityH="H") in all of the channels when the Ch(i) UMWSRIssue is received from at least one channel.

(6) In all of the channels that receive the signal for providing higher priority to the user multi-queue 253_(i) (UMWPriorityH="H"), the user multi-queues 253_0 to 253_n are provided with higher priority. In this case, even if a read command is supplied to each of the channels, the read command is not issued. At an operational timing at which the issuing order determination circuits 851_0 to 851_n in all of the channels receive the ALLCmdReady="H", the write commands are issued with all of the channels synchronized with each other.

In this manner, in the second embodiment, if the write commands are ready to be issued in all of the channels, a read command is permitted to be issued in an arbitrary channel only once, and then the user multi-queues 253_0 to 253_n in all of the channels are made higher in priority forcibly. This makes it possible to issue the write commands quickly compared with the first embodiment.

The write processes on a typical NAND-type flash memory, which is considered to be in the order of several ms, requires more processing time than the read process. Therefore, by causing the write processes to wait, the performance in the entire system is influenced significantly. If the write commands are issued preferentially at the time when the write commands are ready to be issued, it is possible to enhance the performance in the entire system.

In other words, in the second embodiment, even if the read commands continue to be supplied sequentially, the write commands are issued preferentially by the control described above, whereby the write commands are prevented from being waited for issuance for a long time. Accordingly, the performance in the entire data storage device 1 according to the second embodiment can be enhanced.

As described above, according to the first and the second embodiments, the memory controller chip 100 of the data storage device 1 issues the read command preferentially until the write commands in all of the channels are ready to be issued. This can prevent the issuance of the read command waited for a long time, thereby enhancing the performance in the issue of the read command.

Furthermore, according to the first and the second embodiments, when both the issuance of the write commands in the multi-channel access and the issuance of the read command in the single channel access are ready, the memory controller chip 100 of the data storage device 1 specifies commands to be preferentially issued from between the read command and the write commands, alternatively, by using the round-robin. This can prevent the issuance of the read command to be waited for a long time, thereby enhancing the performance in the issue of the read command. In the same manner, the issuance of the write commands can be prevented from being waited for a long time, whereby the performance in the issuance of the write commands can be enhanced.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
 a nonvolatile memory including a plurality of memory areas, the plurality of memory areas being connected to a plurality of channels; and
 a controller controlling the nonvolatile memory, wherein the controller is configured to:
  in response to a reading from any one of the plurality of memory areas being completed,
   when a first processing and a second processing are ready to be performed, the first processing being a parallel writing to the plurality of memory areas, the second processing being a reading from any one of the plurality of memory areas,
   give higher priority to the first processing over the second processing as a next command to be executed; and
  in response to a parallel writing to the plurality of memory areas being completed,
   when the first processing and the second processing are ready to be performed,
   give higher priority to the second processing over the first processing as a next command to be executed,
  wherein, in a case that the first processing and the second processing are ready to be performed, the controller alternately performs the first processing and the second processing one after the other.

2. The memory system according to claim 1, wherein the controller is configured to generate error correction codes based on data to be written to the plurality of memory areas, and write the generated error correction codes to one memory area among the plurality of memory areas, when the parallel writing is performed.

3. A method for controlling a nonvolatile memory, the nonvolatile memory including a plurality of memory areas, the plurality of memory areas being connected to a plurality of channels, the method comprising:

in response to a reading from any one of the plurality of memory areas being completed,
when a first processing and a second processing are ready to be performed, the first processing being a parallel writing to the plurality of memory areas, the second processing being a reading from any one of the plurality of memory areas,
giving higher priority to the first processing over the second processing as a next command to be executed; and in response to a parallel writing to the plurality of memory areas being completed,
when the first processing and the second processing are ready to be performed,
giving higher priority to the second processing over the first processing as a next command to be executed, wherein, in a case that the first processing and the second processing are ready to be performed, alternately performing the first processing and the second processing one after the other.

4. The method according to claim 3, further comprising generating error correction codes based on data to be written to the plurality of memory areas, and writing the generated error correction codes to one memory area among the plurality of memory areas, when the parallel writing is performed.

5. A memory system comprising:
a memory including a plurality of memory areas; and
a controller controlling the memory, wherein
the controller is configured to:
in a case that a read process from any one of the plurality of memory areas is completed, and when a next read process and a next parallel write process are ready, perform the next parallel write process to the plurality of memory areas before the next read process; and
in a case that a parallel write process is completed, and when the next read process and next parallel write process are ready, perform the next read process before the next parallel write process,
wherein, in a case that the parallel write process and the read process are ready to be performed, the controller alternately performs the parallel write process and the read process one after the other.

* * * * *